(12) United States Patent
Tokuchi et al.

(10) Patent No.: US 11,900,013 B2
(45) Date of Patent: Feb. 13, 2024

(54) INFORMATION PROCESSING APPARATUS, NON-TRANSITORY COMPUTER READABLE MEDIUM STORING PROGRAM, AND INFORMATION PROCESSING METHOD

(71) Applicant: FUJIFILM Business Innovation Corp., Tokyo (JP)

(72) Inventors: Kengo Tokuchi, Kanagawa (JP); Takahiro Okayasu, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 192 days.

(21) Appl. No.: 17/380,032

(22) Filed: Jul. 20, 2021

(65) Prior Publication Data

US 2022/0222035 A1    Jul. 14, 2022

(30) Foreign Application Priority Data

Jan. 12, 2021    (JP) ................................. 2021-002676

(51) Int. Cl.
*G06F 3/16*    (2006.01)
*G06T 7/70*    (2017.01)
*H04L 65/403*    (2022.01)
*G06T 7/20*    (2017.01)

(52) U.S. Cl.
CPC ............... *G06F 3/165* (2013.01); *G06T 7/20* (2013.01); *G06T 7/70* (2017.01); *H04L 65/403* (2013.01); *G06T 2207/30201* (2013.01)

(58) Field of Classification Search
CPC .................................. G06F 3/165; G06F 3/16
See application file for complete search history.

(56) References Cited

U.S. PATENT DOCUMENTS

| | | | |
|---|---|---|---|
| 10,440,324 B1 * | 10/2019 | Lichtenberg | H04L 12/1827 |
| 11,049,511 B1 * | 6/2021 | Seethaler | G10L 25/78 |
| 2010/0205667 A1 * | 8/2010 | Anderson | G06F 3/017 |
| | | | 726/19 |
| 2021/0012780 A1 * | 1/2021 | Nicholson | G06F 3/167 |
| 2022/0122583 A1 * | 4/2022 | Bates | H04L 12/1818 |

FOREIGN PATENT DOCUMENTS

| | | | |
|---|---|---|---|
| CN | 111833876 A | * | 10/2020 |
| JP | 2000020683 | | 1/2000 |
| JP | 2011066467 | | 3/2011 |
| JP | 2011193392 | | 9/2011 |

* cited by examiner

Primary Examiner — Olisa Anwah
(74) Attorney, Agent, or Firm — JCIPRNET (57) ABSTRACT

An information processing apparatus includes a processor configured to change control of sound collection in accordance with a state of an upper body region of a user who is photographed, during a communication of transmitting a sound.

17 Claims, 7 Drawing Sheets

INFORMATION PROCESSING APPARATUS, NON-TRANSITORY COMPUTER READABLE MEDIUM STORING PROGRAM, AND INFORMATION PROCESSING METHOD

CROSS-REFERENCE TO RELATED APPLICATIONS

This application is based on and claims priority under 35 USC 119 from Japanese Patent Application No. 2021-002676 filed Jan. 12, 2021.

BACKGROUND

(i) Technical Field

The present invention relates to an information processing apparatus, a non-transitory computer readable medium storing a program, and an information processing method.

(ii) Related Art

JP2000-20683A discloses a communication conference system in which reception terminals have a conversation with each other via a communication network.

JP2011-66467A discloses a television conference terminal device that is connected to a network and communicates with a partner terminal through images and voices.

JP2011-193392A discloses an apparatus that automatically sets the sound collection of a microphone in accordance with the arrangement of conference attendees.

SUMMARY

Aspects of non-limiting embodiments of the present disclosure relate to an information processing apparatus, a non-transitory computer readable medium storing a program, and an information processing method for preventing an occurrence of a situation in which a sound which is not to be transmitted to a communication partner during a communication of transmitting a sound.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to change control of sound collection in accordance with a state of an upper body region of a user who is photographed, during a communication of transmitting a sound.

BRIEF DESCRIPTION OF THE DRAWINGS

Exemplary embodiment(s) of the present invention will be described in detail based on the following figures, wherein.

DETAILED DESCRIPTION

Figure 1:
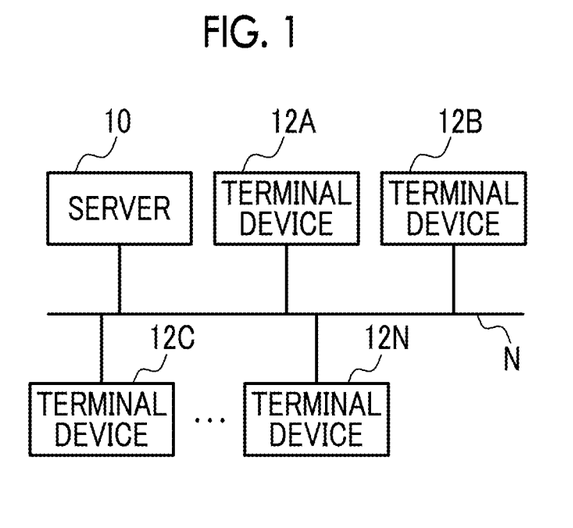
FIG. 1 is a block diagram illustrating a configuration of an information processing system according to an exemplary embodiment.

An information processing system according to an exemplary embodiment will be described with reference to FIG. 1. FIG. 1 illustrates an example of a configuration of the information processing system according to the present exemplary embodiment.

The information processing system according to the present exemplary embodiment includes, for example, a server 10 and N (N is an integer of 1 or more) terminal devices. In the example illustrated in FIG. 1, the information processing system according to the present exemplary embodiment includes terminal devices 12A, 12B, 12C, ..., and 12N. The number of terminal devices illustrated in FIG. 1 is just an example. One or a plurality of terminal devices may be provided in the information processing system according to the present exemplary embodiment. In a case where it is not necessary to distinguish the terminal devices 12A, 12B, 12C, ..., and 12N from each other, the terminal devices are referred to as a "terminal device 12" below. The information processing system according to the present exemplary embodiment may include devices other than the server 10 and the terminal device 12.

The server 10 and each terminal device 12 have a function of communicating with other devices. The communication may be a wired communication using a cable or a wireless communication. That is, each device may be physically connected to another device by the cable to transmit and receive information, or may transmit and receive information by a wireless communication. A wireless communication includes, for example, a short-range wireless communication, Wi-Fi (registered trademark), and the like. The short-range wireless communication includes, for example, Bluetooth (registered trademark), the radio frequency identifier (RFID), NFC, and the like. For example, each device may communicate with another device via a communication path N such as a local area network (LAN) or the Internet. Each device may communicate with another device via a telephone line.

In the present exemplary embodiment, at least a sound is transmitted to a communication partner by communication. An image, a moving image, a text string, control data, and the like may be transmitted to a communication partner together with the sound. For example, the sound may be transmitted to the partner via the communication path N, or the sound may be transmitted to the partner via the telephone line. As one situation to which the present exemplary embodiment is applied, at least a sound is transmitted to the partner in an online conference held via the communication path N. In another situation, the sound is transmitted to the partner via the telephone line. The present exemplary embodiment may be applied to situations other than the above situations.

The server 10 transmits at least a sound to the communication partner. For example, the server 10 provides an online service via the communication path N. A user can use the online service by using the terminal device 12. For example, the user can transmit at least a sound to the partner by using the online service. A base station forming a telephone line may be included in the information processing system, and the user may transmit a sound to the partner via the telephone line by using the terminal device 12.

Examples of the online service include an online conference, a service for providing contents online, an online game, an online shopping, a social network services (SNS), and combinations thereof. The online conference may be referred to as a web conference, a remote conference, a video conference, and the like. The user can use an online conference to transmit at least a sound to another user. Examples of the contents include entertainment (for example, concerts, plays, movies, moving images, music, and the like), sports, and e-sports. For example, a moving-image distribution service and a music distribution service are examples of the service for providing contents online. The user can watch entertainment online or watch sports and e-sports.

The online service may be a service using a virtual space or a service of not using the virtual space. The virtual space has a concept that contrasts with the real space. Examples of the virtual space include a virtual space realized by a computer, a virtual space formed on a network such as the Internet, a virtual space realized by the virtual reality (VR) technology, and a cyber space. For example, a virtual three-dimensional space or a two-dimensional space corresponds to an example of the virtual space.

The server 10 stores and manages account information of a user who uses the online service. The account information is information for logging in to the online service to use the online service, and is, for example, information including a user ID and a password. For example, by transmitting the account information to the server 10 and logging in to the online service, the user associated with the account information is permitted to participate in the online service and use the online service. The user may be able to use the online service without registering the own account information in the online service.

Examples of the terminal device 12 include a personal computer (referred to as a "PC" below), a tablet PC, a smartphone, a wearable device (for example, augmented reality (AR) glasses, virtual reality (VR) glasses, and bearable device) or a portable phone. The user can transmit a sound to the communication partner by using the terminal device 12.

An automatic response partner such as a chatbot may participate in the online service. For example, the automatic response partner functions as a response assistant that responds to an inquiry of the user. The automatic response partner receives an utterance of the user, analyzes the content of the utterance, creates a response and the like to the utterance, and notifies the user of the created response. The automatic response partner is realized, for example, by executing a program. The program is stored in, for example, the server 10 or another device (for example, another server or terminal device 12). The automatic response partner may be realized by artificial intelligence (AI). Any algorithm used for the artificial intelligence may be used.

In the following description, as an example, it is assumed that an online conference is used by a user, and a sound is transmitted to the communication partner by the online conference. The online conference is just an example of transmitting the sound to a communication partner. In an example other than the online conference, sound collection described later is controlled similar to the online conference.

Figure 2:
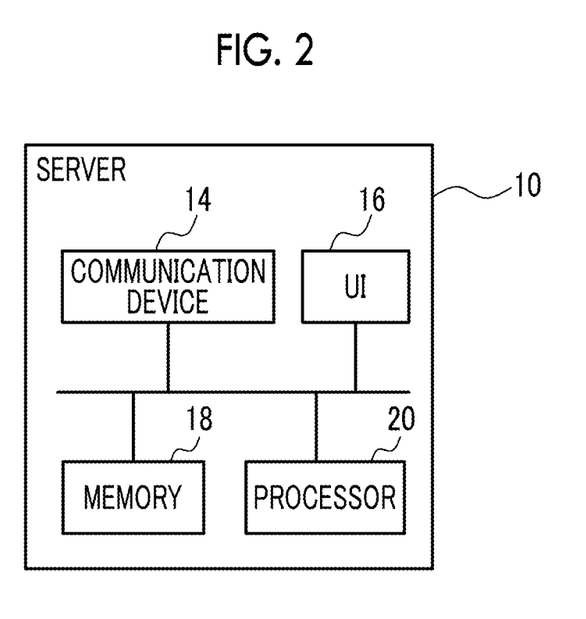
FIG. 2 is a block diagram illustrating a configuration of a server according to the present exemplary embodiment.

The hardware configuration of the server 10 will be described below with reference to FIG. 2. FIG. 2 illustrates an example of the hardware configuration of the server 10.

The server 10 includes, for example, a communication device 14, a UI 16, a memory 18, and a processor 20.

The communication device 14 is a communication interface having a communication chip, a communication circuit, and the like. The communication device has a function of transmitting information to another device and a function of receiving information from the other device. The communication device 14 may have a wireless communication function or a wired communication function. The communication device 14 may communicate with another device by using, for example, short-range wireless communication, or may communicate with another device via the communication path N.

The UI 16 is a user interface and includes at least one of a display or an operation device. The display is a liquid crystal display, an EL display, or the like. The operation device is a keyboard, a mouse, an input key, an operation panel, or the like. The UI 16 may be a UI such as a touch panel having both the display and the operation device.

The memory 18 is a device that forms one or a plurality of storage regions for storing various types of information. Examples of the memory 18 include a hard disk drive, various types of memories (for example, RAM, DRAM, and ROM), other storage devices (for example, optical disk), and a combination thereof. One or a plurality of memories 18 are included in the server 10.

The processor 20 is configured to control the operation of the units in the server 10. The processor 20 may include a memory. For example, the processor 20 provides the online service for the user.

Figure 3:
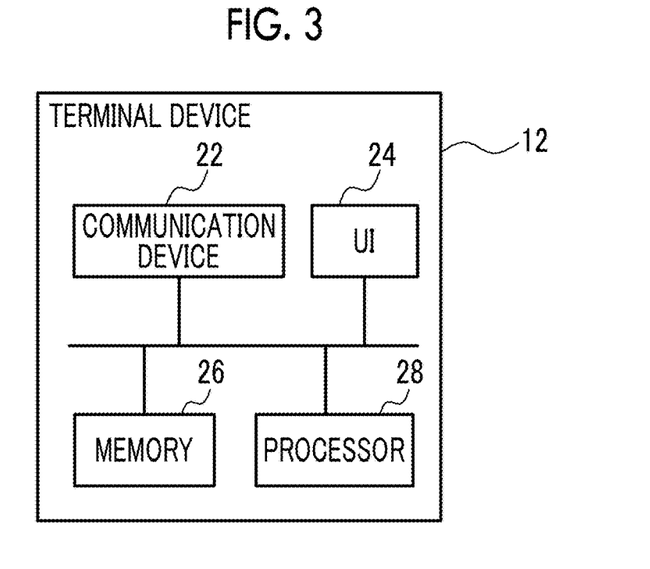
FIG. 3 is a block diagram illustrating a configuration of a terminal device according to the present exemplary embodiment.

The hardware configuration of the terminal device 12 will be described below with reference to FIG. 3. FIG. 3 illustrates an example of the hardware configuration of the terminal device 12.

The terminal device 12 includes, for example, a communication device 22, a UI 24, a memory 26, and a processor 28.

The communication device 22 is a communication interface having a communication chip, a communication circuit, and the like. The communication device has a function of transmitting information to another device and a function of receiving information transmitted from the other device. The communication device 22 may have a wireless communication function or a wired communication function. The communication device 22 may communicate with another device by using, for example, short-range wireless communication, or may communicate with another device via the communication path N.

The UI 24 is a user interface and includes at least one of a display or an operation device. The display is a liquid crystal display, an EL display, or the like. The operation device is a keyboard, a mouse, an input key, an operation panel, or the like. The UI 24 may be a UI such as a touch panel having both the display and the operation device.

The terminal device 12 may include an image pickup device such as a camera, a microphone, and a speaker. All or some of the above devices may be connected to the terminal device 12. Earphones or headphones may be connected to the terminal device 12.

The memory 26 is a device that forms one or a plurality of storage regions for storing various types of information. Examples of the memory 26 include a hard disk drive, various types of memories (for example, RAM, DRAM, and ROM), other storage devices (for example, optical disk), and a combination thereof. One or a plurality of memories 26 are included in the terminal device 12.

The processor 28 is configured to control the operation of the units in the terminal device 12. The processor 28 may include a memory.

For example, the processor 28 displays an image, a moving image, a text, and the like transmitted by an online conference, on the display of the terminal device 12, outputs a sound transmitted by the online conference, from a speaker, transmits an image, a moving image, and the like generated by image pickup of the camera, to the partner by the online conference, or transmits a sound collected by the microphone to the partner by the online conference.

The terminal device 12 may include at least one of various sensors such as a sensor (for example, global positioning system (GPS) sensor) that acquires position information of the terminal device 12, a gyro sensor that detects the orientation and the posture, or an acceleration sensor.

Examples of the present exemplary embodiment will be described below. The processor 20 of the server 10 or the processor 28 of the terminal device 12 may perform processing according to each example. The processor 20 and the processor cooperate with each other to perform the processing according to each example. The processor 20 may perform a portion of certain processing, and the processor 28 may perform other portions of the processing. The server 10, the terminal device 12, or a combination thereof corresponds to an example of the information processing apparatus according to the present exemplary embodiment.

In the following description, as an example, users A, B, C, and D are participating in the same online conference. The user A logs in to the online conference using a terminal device 12A to participate in the online conference. The user B logs in to the online conference using a terminal device 12B to participate in the online conference. The user C logs in to the online conference using a terminal device 12C to participate in the online conference. The user D logs in to the online conference using a terminal device 12D to participate in the online conference. A plurality of users may log in to the online conference using the same terminal device 12 to participate in the online conference. The users may be able to participate in the online conference without logging in to the online conference.

An image and a moving image of each user participating in the online conference are displayed on the display of the terminal device 12 of each user. A text string for identifying the user may be displayed on the display with or without displaying the image or the moving image of the user. An authorized user or an administrator may permit or may not permit participation of each user in the online conference. In this case, the user of which the participation is permitted can participate in the online conference. Ina case where the user invites another user to the online conference and this user indicates the intention to participate, this user may be able to participate in the online conference.

Figure 4:
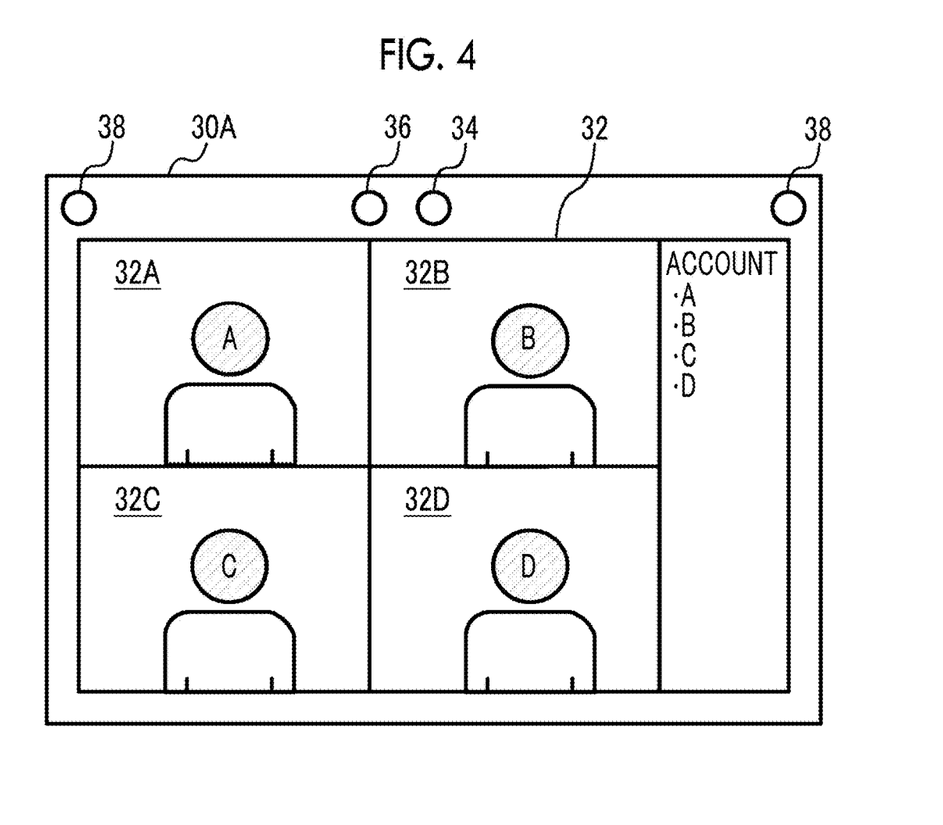
FIG. 4 is a diagram illustrating a screen.

FIG. 4 illustrates a screen 32 displayed on a display 30A. The display 30A is a display of the terminal device 12A of the user A. A screen similar to the screen 32 is displayed on the display of each of the terminal devices 12B, 12C, and 12D.

In the example illustrated in FIG. 4, a camera 34, a microphone 36, and a speaker 38 are provided on the display 30A. The camera 34 may be a camera referred to as an in-camera, a front camera, or the like. The location where the camera 34, the microphone 36, and the speaker 38 are provided is not limited to the display 30A, and may be a location other than the display 30A in the terminal device 12A. All or some of the camera 34, the microphone 36, and the speaker 38 may be provided in the terminal device 12A (for example, all or some may be built in the terminal device 12A). Alternatively, all or some may be not provided in the terminal device 12A (for example, all or some may not be built in the terminal device 12A), but provided around the terminal device 12A, and be connected to the terminal device 12A. A plurality of cameras 34, a plurality of microphones 36, and a plurality of speakers 38 may be connected to the terminal device 12A. The microphone may be attached to the user A, or earphones or headphones may be attached to the user A. In a case where the terminal device 12A is a wearable device such as AR glasses or VR glasses, a microphone and a speaker may be provided in the wearable device.

In the following description, for convenience of description, it is assumed that the camera 34 provided in the terminal device 12A (that is, built-in camera) and a camera connected to the terminal device 12A without being provided in the terminal device 12A (that is, an external camera) are referred to as a camera of the terminal device 12A. That is, the category of the concept of the camera of the terminal device 12A includes not only the camera 34 provided in the terminal device 12A but also the camera connected to the terminal device 12A without being provided in the terminal device 12A. This is similarly applied to the terminal devices 12B, 12C, and 12D. The category of the concept of the camera of each of the terminal devices 12B, 12C, and 12D includes a built-in camera and an external camera.

Similarly, it is assumed that the microphone 36 provided in the terminal device 12A (that is, built-in microphone) and a microphone connected to the terminal device 12A without being provided in the terminal device 12A (that is, external microphone) are referred to as a microphone of the terminal device 12A. That is, the category of the concept of the microphone of the terminal device 12A includes not only the microphone 36 provided in the terminal device 12A but also the microphone connected to the terminal device 12A without being provided in the terminal device 12A. This is similarly applied to the terminal devices 12B, 12C, and 12D. The category of the concept of the microphone of each of the terminal devices 12B, 12C, and 12D includes a built-in microphone and an external microphone.

Similarly, it is assumed that the speaker 38 provided in the terminal device 12A (that is, built-in speaker) and a speaker connected to the terminal device 12A without being provided in the terminal device 12A (that is, external speaker) are referred to as a speaker of the terminal device 12A. That is, the category of the concept of the speaker of the terminal device 12A includes not only the speaker 38 provided in the terminal device 12A but also the speaker connected to the terminal device 12A without being provided in the terminal device 12A. This is similarly applied to the terminal devices 12B, 12C, and 12D. The category of the concept of the speaker of each of the terminal devices 12B, 12C, and 12D includes a built-in speaker and an external speaker.

An image or a moving image representing each user participating in the online conference is displayed on the screen 32. It is assumed that the image or the moving image representing a user is referred to as a "user image". The user images of all users participating in the online conference may be displayed, or the user images of some users may be displayed. The user image to be displayed may be designated by the user A, or the user may designate the display or non-display of the own user image. The user image may be an image or a moving image generated by photographing the user with the camera, or may be a schematic image (for example, icon and avatar) representing the user. The user image may be a still image or a moving image. Data of the user image generated by the photographing of the camera is transmitted to the terminal device 12 of another user from the terminal device 12 of the user via the server 10, and then the user image is displayed on the display of the terminal device 12 of each user. The microphone collects a sound such as a voice of the user. Data of the sound is transmitted to the terminal device 12 of another user from the terminal device 12 of the user via the server 10, and then is output from the speaker of the terminal device 12 of each user. The utterance of the user may be displayed as a text string. Each user can transmit and receive information such as sounds, images, moving images, and text strings, to and from other users by the online conference.

For example, display regions corresponding to the number of users participating in the online conference are formed on the screen 32, and user images are displayed in the respective display regions. In the example illustrated in FIG. 4, the users A, B, C, and D participate in the same online conference by using the own terminal devices 12, and display regions 32A, 32B, 32C, and 32D are formed on the screen 32. The user image of the user A is displayed in the display region 32A. The user image of the user B is displayed in the display region 32B. The user image of the user C is displayed in the display region 32C. The user image of the user D is displayed in the display region 32D.

For example, an image or a moving image generated by photographing with the camera of the terminal device 12A is displayed in the display region 32A. In a case where the user A is photographed by the camera of the terminal device 12A, the user image representing the user A is displayed in the display region 32A. Similarly, an image or a moving image generated by photographing with the camera of the terminal device 12B is displayed in the display region 32B. An image or a moving image generated by photographing with the camera of the terminal device 12C is displayed in the display region 32C. An image or a moving image generated by photographing with the camera of the terminal device 12D is displayed in the display region 32D.

Even in a case where the user A is photographed by the camera of the terminal device 12A, an icon, an avatar, or the like schematically representing the user A may be displayed in the display region 32A, instead of the user image generated by the photographing. This is similarly applied to the users B, C, and D.

Similar to the screen 32, on the screens of the terminal devices 12B, 12C, and 12D, the display regions 32A, 32B, 32C, and 32D are formed, and images and moving images generated by photographing with the cameras of the terminal devices 12 are displayed.

The size of each display region may be changed in accordance with the user or may be changed in accordance with whether or not each user speaks. For example, the display region of the user who is speaking may be large, and the display region of the user who is not speaking may be small. Information (for example, account information, name, and ID) for identifying each user participating in the online conference may be displayed on the screen 32.

In a case where the microphone of the terminal device 12A collects a sound, the collected sound is output from the respective speakers 38 of the terminal devices 12B, 12C, and 12D. For example, in a case where the user A speaks, the voice of the user A is collected by the microphone of the terminal device 12A and output from the respective speakers of the terminal devices 12B, 12C, and 12D. Similarly, in a case where sounds are collected by the respective microphones of the terminal devices 12B, 12C, and 12D, the collected sounds are output from the speakers of the other terminal devices 12.

The processor 28 of the terminal device 12A changes the control of sound collection by the microphone of the terminal device 12A, in accordance with the state of the upper body region of the user A being photographed. Similar processing is performed in the terminal device 12 of another user. That is, the processor 28 of the terminal device 12B changes the control of sound collection by the microphone of the terminal device 12B, in accordance with the state of the upper body region of the user B being photographed. The processor 28 of the terminal device 12C changes the control of sound collection by the microphone of the terminal device 12C, in accordance with the state of the upper body region of the user C being photographed. The processor 28 of the terminal device 12D changes the control of sound collection by the microphone of the terminal device 12D, in accordance with the state of the upper body region of the user D being photographed.

All the terminal devices 12A, 12B, 12C, and 12D may change the control of sound collection in accordance with the state of the upper body region of the user being photographed. Some of the terminal devices 12A, 12B, 12C, and 12D may change the control of sound collection in accordance with the state of the upper body region of the user being photographed.

The user may set whether or not to perform a function of changing the control of sound collection in accordance with the state of the upper body region of the user. For example, in a case where the user A turns on the function, the processor 28 of the terminal device 12A changes the control of sound collection in accordance with the state of the upper body region of the user A being photographed. In a case where the user A turns off the function, the processor 28 of the terminal device 12A does not change the control of sound collection in accordance with the state of the upper body region of the user A being photographed. This is similarly applied to other terminal devices 12.

The processor 20 of the server 10 may control the sound collection of the microphone in each terminal device 12. In the following description, it is assumed that the processor of the terminal device 12 controls the sound collection of the microphone in the terminal device 12.

Examples of the upper body region of the user include a region above the shoulders of the user, a region above the neck of the user, and a region (referred to as a "face region" below) of the face of the user. Examples of the state of the upper body region of the user include the direction, the inclination, the shape, the movement, the sight line, and combinations thereof of the upper body region of the user. Examples of the face region of the user include the face of the user who does not wear an object such as a mask, and the face of the user who wears an object such as a mask.

The processor 28 of the terminal device 12A detects the state of the upper body region of the user A, for example, based on an image representing the upper body region of the user A (for example, user image generated by the camera of the terminal device 12A photographing the user A), detection results of various sensors (for example, gyro sensor and acceleration sensor), or combinations thereof. This is similarly applied to other terminal devices 12.

Specifically, the processor 28 of the terminal device 12A may detect the direction, the inclination, and the shape of the face region of the user A based on an image representing the face region of the user A. The processor 28 of the terminal device 12A may detect the direction, the inclination, the shape, the movement, and the sight line of a region above the neck of the user A based on an image representing the region above the neck of the user A. The processor 28 of the terminal device 12A may detect the direction, the inclination, the movement, and the sight line of the face region of the user or the region above the neck of the user by various sensors (for example, gyro sensor and acceleration sensor) worn by the user A. For example, a hearable device including various sensors may be worn on the ear of the user, or AR glasses or VR glasses including various sensors may be worn on the user. The direction, the inclination, and the movement of the face of the user are detected by various sensors provided in the hearable device, the AR glasses, and the VR glasses. This is similarly applied to other terminal devices 12.

Processing according to the exemplary embodiment will be described below focusing on the terminal device 12A of the user A, but similar processing is performed in the terminal devices 12B, 12C, and 12D.

The processor 28 of the terminal device 12A performs or does not perform sound collection in accordance with the state of the upper body region of the user A.

For example, in a case where the direction of the upper body region of the user A corresponds to a specific direction, the inclination of the upper body region of the user A corresponds to a specific inclination, the shape of the upper body region of the user A corresponds to a specific shape, or the movement of the upper body region of the user A corresponds to a specific movement, the processor 28 of the terminal device 12A performs sound collection with the microphone of the terminal device 12A. Specifically, the processor 28 of the terminal device 12A turns on the microphone of the terminal device 12A to perform sound collection. The sound collected by the microphone of the terminal device 12A is output from the respective speakers of the terminal devices 12B, 12C, and 12D. For example, in a case where the user A speaks, the voice of the user A is output from the respective speakers of the terminal devices 12B, 12C, and 12D.

For example, in a case where the direction of the upper body region of the user A does not correspond to the specific direction, the inclination of the upper body region of the user A does not correspond to the specific inclination, the shape of the upper body region of the user A does not correspond to the specific shape, or the movement of the upper body region of the user A does not correspond to the specific movement, the processor 28 of the terminal device 12A does not perform sound collection with the microphone of the terminal device 12A. In this case, even though the user A speaks, the voice of the user A is not output from the respective speakers of the terminal devices 12B, 12C, and 12D.

The category of the concept of not performing sound collection includes a case where the microphone of the terminal device 12A is turned off, a case where the sound collection by the microphone of the terminal device 12A is muted, and a case where the sound collected by the microphone is cut (for example, deleted).

Similarly, the processors 28 of the terminal devices 12B, 12C, and 12D perform or do not perform sound collection in accordance with the state of the upper body region of each of the users B, C, and D.

The processor 28 of the terminal device 12 may not prevent an output of data of a sound although sound collection is performed, instead of not performing sound collection. For example, the processor 28 of the terminal device 12 may not transmit data of the sound to other terminal devices 12. As another example, the processor 28 of the terminal device 12 may transmit the data of the sound to the server 10, but the server 10 may not transmit the data of the sound to other terminal devices 12. As yet another example, even though the data of the sound is transmitted to other terminal devices 12, the processor 28 of the other terminal device 12 may not output the sound from the speaker. The above aspects may also be included in one aspect of not performing sound collection.

Figure 5:
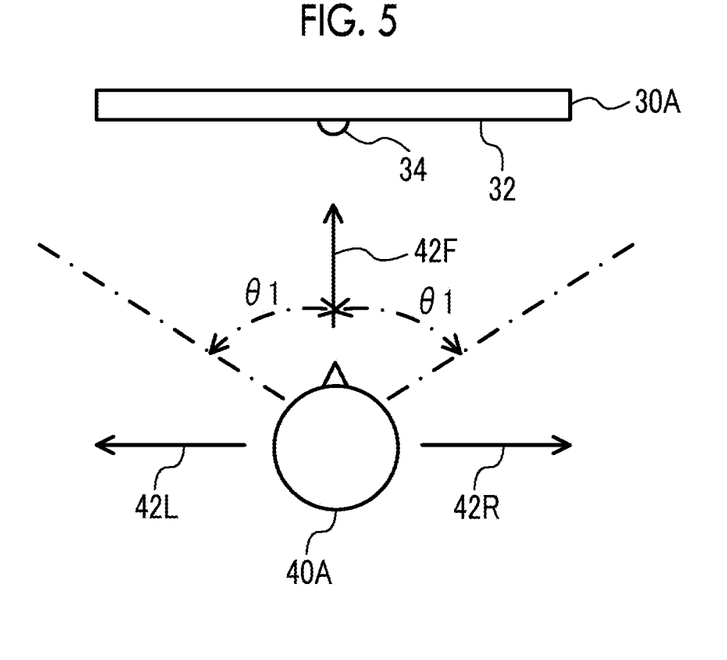
FIG. 5 is a diagram illustrating a positional relation between a display and a user.

A specific example will be described below with reference to FIG. 5. FIG. 5 is a diagram illustrating a positional relation between the display 30A of the terminal device 12A and the user A. FIG. 5 illustrates the display 30A and the user A in a case of being viewed from the top of the head 40A of the user A. In the specific example, as an example, the state of the upper body region of the user A means the direction of the face region of the user A, more specifically, the direction of the face of the user A.

For example, in a case where the front of the face of the user A is photographed by the camera of the terminal device 12A, the processor 28 of the terminal device 12A performs sound collection with the microphone of the terminal device 12A. In a case where the front of the face of the user A is not photographed by the camera of the terminal device 12A, the processor 28 of the terminal device 12A does not perform sound collection. Describing the example illustrated in FIG. 5, the processor 28 of the terminal device 12A performs sound collection with the microphone of the terminal device 12A in a case where the front of the face of the user A is photographed by the camera 34 provided on the display 30A, and does not perform sound collection in a case where the front of the face of the user A is not photographed by the camera 34. For example, in a case where the user A sees the screen 32 of the display 30A, the front of the face of the user A is photographed by the camera 34. In this case, the processor 28 of the terminal device 12A performs sound collection with the microphone of the terminal device 12A.

For example, the face of the user A is photographed by the camera of the terminal device 12A, and the processor 28 of the terminal device 12A analyzes the user image generated by the photographing, so as to determine whether or not the front of the face of the user A is photographed by the camera of the terminal device 12A. That is, the processor 28 of the terminal device 12A determines whether or not the front of the face of the user A is represented in the user image. As a technique for analyzing an image, for example, a known technique is used. The processor 28 of the terminal device 12A performs sound collection with the microphone of the terminal device 12A in a case where the front of the face of the user A is represented in the user image, and does not perform the sound collection in a case where the front of the face of the user A is not represented in the user image.

This will be described in detail with reference to FIG. 5. The reference sign of 42F in FIG. 5 indicates a forward direction of the user A. The reference sign of 42R in FIG. 5 indicates a rightward direction of the user A. The reference sign of 42L in FIG. 5 indicates a leftward direction of the user A. The direction indicated by the reference sign of 42F is perpendicular to the screen 32. The directions indicated by the reference signs of 42R and 42L are parallel to the screen 32.

In a case where the user A sees the screen 32, the direction of the user A coincides with the direction indicated by the reference sign of 42F, and the front of the face of the user A is photographed by the camera 34. In this case, the processor 28 of the terminal device 12A performs sound collection with the microphone of the terminal device 12A.

The direction indicated by the reference sign of 42F may be defined as a reference direction, a direction inclined by an angle θ1 from the reference direction to the right or left may be defined, and a range of 2×angle θ1 may be defined as a front range. In a case where the direction of the face of the user A is included in the front range, the processor 28 of the terminal device 12A may perform sound collection with the microphone of the terminal device 12A. That is, even in a case where the right front of the face of the user A is not photographed by the camera of the terminal device 12A, and the face of the user A is photographed by the camera of the terminal device 12A in a state where the face of the user A is shifted by an angle θ1 from the right front, the processor 28 of the terminal device 12A may perform sound collection with the microphone of the terminal device 12A.

Figure 6:
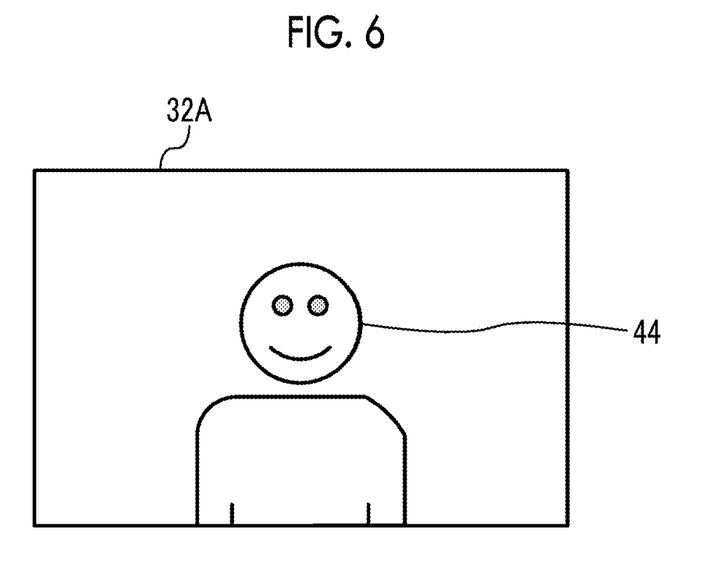
FIG. 6 is a diagram illustrating a screen.
Figure 7:
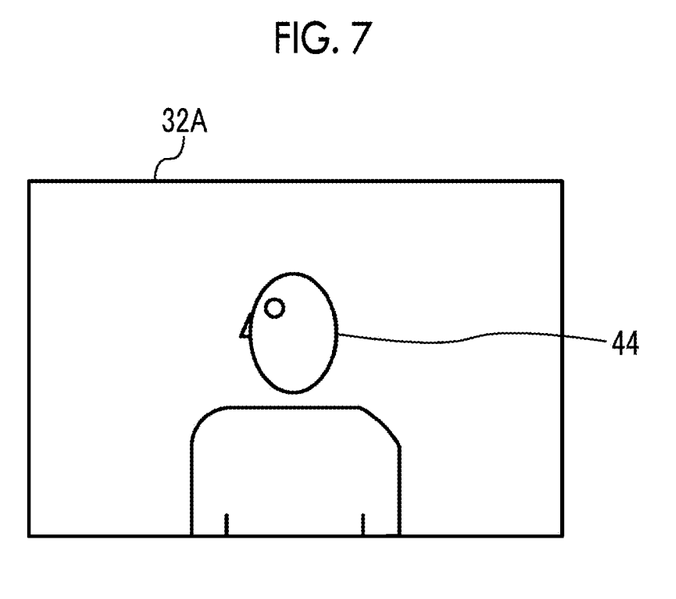
FIG. 7 is a diagram illustrating the screen.

FIGS. 6 and 7 illustrate a user image 44 of the user A. FIGS. 6 and 7 illustrate the display region 32A being a portion of the screen 32. In FIGS. 6 and 7, illustrations of portions other than the display region 32A are omitted. The user image 44 may be a still image or a moving image.

The user image 44 illustrated in FIG. 6 is a user image generated in a case where the front of the face of the user A is photographed by the camera of the terminal device 12A. In a case where the front of the face of the user A is photographed by the camera of the terminal device 12A, the front of the face of the user A is displayed in the display region 32A as illustrated in FIG. 6. In this case, the processor 28 of the terminal device 12A performs sound collection with the microphone of the terminal device 12A. For example, in a case where the user A speaks, the voice of the user A is collected by the microphone of the terminal device 12A and is output from the respective speakers of the terminal devices 12B, 12C, and 12D.

The user image 44 illustrated in FIG. 7 is a user image generated in a case where the left side of the face of the user is photographed by the camera of the terminal device 12A. In a case where the user A looks in the direction indicated by the reference sign of 42R in FIG. 5 (that is, in a case where the user A looks to the right), the left side of the face of the user A is photographed by the camera of the terminal device 12A. Thus, as illustrated in FIG. 7, the left side of the face of the user A is displayed in the display region 32A. In this case, the processor 28 of the terminal device 12A does not perform sound collection. Similarly, in a case where the user A looks to the left, the processor 28 of the terminal device 12A does not perform sound collection.

The control of sound collection may be changed by focusing on a region of the mouth of the user. For example, in a case where the front of the mouth of the user A is photographed by the camera of the terminal device 12A, the processor 28 of the terminal device 12A performs sound collection with the microphone of the terminal device 12A. In a case where the front of the mouth of the user A is not photographed by the camera of the terminal device 12A, the processor 28 of the terminal device 12A does not perform sound collection.

The processor 28 of the terminal device 12A may detect the direction of the face of the user A with various sensors (for example, gyro sensor and acceleration sensor). In a case where the face of the user A is directed to the screen 32, the processor 28 of the terminal device 12A may perform sound collection with the microphone of the terminal device 12A. In a case where the face of the user A is not directed to the screen 32, the processor 28 of the terminal device 12A may not perform sound collection. For example, the terminal device 12A is a wearable device including various sensors (for example, bearable device, AR glasses, and VR glasses). The terminal device 12A is attached to the user A, and the direction of the face of the user A is detected by the various sensors.

In a case where the front of the face of the user A is photographed (for example, in a case where the user A sees the screen 32), it is supposed that the user A has a conversation with another user who is participating in the online conference or tries to have a conversation with another user. Therefore, the processor 28 of the terminal device 12A performs sound collection with the microphone of the terminal device 12A so that the utterance of the user A can be picked up in a case where the user A speaks.

In a case where the front of the face of the user A is not photographed (for example, in a case where the user A does not see the screen 32), and the user A speaks, the utterance may not be sent to each user participating in the online conference. For example, an event may occur around the place where the user A is, and the user A may speak about the event. Specifically, the user A may be called, an intercom may ring, a telephone may ring, and then the user A may respond and speak. For example, it is considered that, in a case where the user A is participating in the online conference at the home of the user A, the family member of the user A says "User A, xxx." to initiate a conversation with the user A at the home of the user A. In this case, it is considered that the user A is directed to the family member of the user A (for example, directed to the back of the user A), and says "wait a minute". The utterance of the user A is not sent to other users participating in the online conference and is required not to be transmitted to other users. In this case, the processor 28 of the terminal device 12A does not perform sound collection, and thus the utterance of the user A is not collected. Thus, it is possible to prevent an occurrence of a situation in which the utterance of the user A is transmitted to other users participating in the online conference. As described above, it is possible to prevent an occurrence of a situation where, in a case where the front of the face of the user A is not photographed, the utterance of the user A, which is required not to be transmitted to other users participating in the online conference is transmitted to the other users. Thus, for example, it is possible to prevent an occurrence of a situation where information required not to be transmitted is transmitted to other users, and thus to prevent leakage of such information. That is, it is possible to improve the security of information.

In a case where the front of the face of the user A is photographed and the mouth of the user A is moving, the processor 28 of the terminal device 12A may perform sound collection with the microphone of the terminal device 12A. For example, the processor 28 of the terminal device 12A analyzes the user image representing the user A to determine whether or not the mouth of the user A is moving. In a case where the front of the face of the user A is photographed and the mouth of the user A is moving, it is supposed that the user A speaks to other users participating in the online conference. In this case, the processor 28 of the terminal device 12A performs sound collection with the microphone of the terminal device 12A, so that it is possible to transmit the utterance of the user A to other users participating in the online conference.

In a case where the front of the face of the user A is photographed, but the mouth of the user A is not moving, the processor 28 of the terminal device 12A may not perform sound collection. In a case where the mouth of the user A is not moving, it is supposed that the user A does not speak. In this case, because sound collection is not performed, it is possible to prevent an occurrence of a situation in which a sound other than the utterance of the user A is transmitted to other users participating in the online conference.

In a case where the sound is collected by the microphone of the terminal device 12A and the output of the collected sound is permitted by the user A, the processor 28 of the terminal device 12A may transmit data of the collected sound to the terminal devices 12B, 12C, 12D of other users participating in the online conference. In this case, the sound collected by the microphone of the terminal device 12A is output from the respective speakers of the terminal devices 12B, 12C, and 12D.

For example, the processor 28 of the terminal device 12A stores the data of the collected sound for each predetermined period (for example, every minute). In a case where the output of the sound is permitted by the user A, the processor 28 of the terminal device 12A transmits data of the sound collected for a period for which the output is permitted, to the terminal devices 12B, 12C, and 12D of other users participating in the online conference. Thus, the sound collected for the period for which the output is permitted is output from the respective speakers of the terminal devices 12B, 12C, and 12D later than a time point at which the sound collection has been performed. For example, the processor 28 of the terminal device 12A requests the user for permission of an output every period (for example, every minute), and transmits data of the sound collected for the permitted period to the terminal devices 12B, 12C, and 12D of other users.

In a case where the sound is collected by the microphone of the terminal device 12A, but the output of the collected sound is not permitted, the processor 28 of the terminal device 12A does not transmit data of the collected sound to the terminal devices 12B, 12C, 12D of other users participating in the online conference.

For example, a button for instructing permission to output a sound may be displayed on the display 30A of the terminal device 12A. In a case where the user A presses the button, the output of the sound may be permitted. The user A may permit the output of the sound by voice.

For example, the user A may or may not permit the output of the sound after confirming the collected sound. In a case where the collected sound is a sound required to be transmitted to other users participating in the online conference, it is possible to transmit the sound to other users by permitting the output of the sound. In a case where the collected sound is a sound required not to be transmitted to other users participating in the online conference, it is possible to prevent transmission of the sound to other users by not permitting the output of the sound.

The processor 28 of the terminal device 12A may not collect sounds other than the registered sound. For example, the voice of the user A is registered in the terminal device 12A. The processor 28 of the terminal device 12A collects the voice of the user A with the microphone of the terminal device 12A and does not collect a sound other than the voice of the user A. For example, the processor 28 of the terminal device 12A recognizes the voice of the registered user by using a voice recognition technology. Then, the processor 28 of the terminal device 12A collects the voice of the registered user and does not collect the voice of the unregistered user. A timing of registering the voice may be before the start of the online conference, during the online conference, or designated by the user A. The processor 28 of the terminal device 12A may remove sounds other than the registered sound with a voice filter function.

The processor 28 of the terminal device 12A may collect the sounds of users of which the number is within the registered number of persons. For example, the number of persons is registered in the terminal device 12A. The processor 28 of the terminal device 12A collects the voices of users within the registered number of persons, with the microphone of the terminal device 12A. The processor 28 of the terminal device 12A does not collect voices of users of which the number exceeds the registered number of persons. A timing of registering the number of persons may be before the start of the online conference, during the online conference, or designated by the user.

For example, in a case where three persons are registered in the terminal device 12A, the processor 28 of the terminal device 12A collects the voices of three or less users, and does not collect the voices of the fourth and subsequent users. More specifically, the processor 28 of the terminal device 12A detects the voice of a user A1, which is first collected with the microphone of the terminal device 12, as the voice of the first user, detects the voice of a user A2, which is collected next, as the voice of the second user, and detects the voice of a user A3, which is collected next, as the voice of the third user. The processor 28 of the terminal device 12A identifies the voices of the users A1, A2, and A3, respectively, and manages the voices of the users A1, A2, and A3 separately. After that, the processor 28 of the terminal device 12A collects the voices of the users A1, A2, and A3, and does not collect voices of users other than the users A1, A2, and A3. For example, even though a user A4 speaks, the user A4 is identified as the fourth user, and thus the processor 28 of the terminal device 12A does not collect the voice of the user A4. The voices of the users A1, A2, and A3 may be registered in the terminal device 12A. The processor 28 of the terminal device 12A may collect the registered voices of the users A1, A2, and A3, and may not collect voices of users other than the users A1, A2, and A3.

Figure 8:
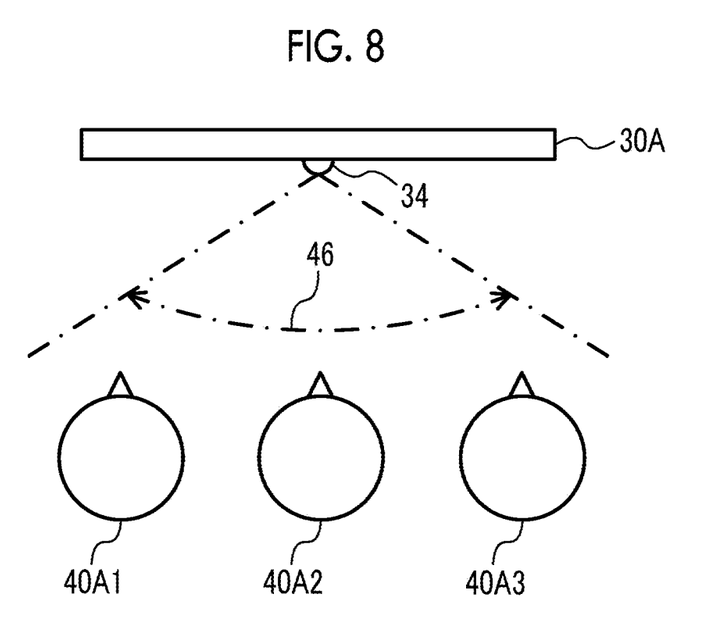
FIG. 8 is a diagram illustrating a positional relation between a display and a user.

In a case where a plurality of users are photographed and the mouths of all the users are not moving, the processor 28 of the terminal device 12A may not perform sound collection. This processing will be described with reference to FIG. 8. FIG. 8 is a diagram illustrating the positional relation between the display 30A and the users A1, A2, and A3. FIG. 8 illustrates the display 30A and the users A1, A2, and A3 in a case of being viewed from the top of the respective heads 40A1, 40A2, and 40A3 of the users A1, A2, and A3.

In the example illustrated in FIG. 8, the users A1, A2, and A3 are within a photographing range 46 of the camera 34 provided on the display 30A, and the faces of the users A1, A2, and A3 are photographed by the camera 34. The user image of each of the users A1, A2, and A3 is displayed in the display region 32A of the screen 32.

As illustrated in FIG. 8, in a case where the users A1, A2, and A3 are photographed and the mouths of all the users A1, A2, and A3 are not moving, the processor 28 of the terminal device 12A does not perform sound collection. In a case where the mouths of all the users A1, A2, and A3 are not moving, it is supposed that none of the users A1, A2, and A3 speaks. Thus, the processor 28 of the terminal device 12A does not perform sound collection.

In a case where the mouth of at least one of the user A1, A2, or A3 is moving, the processor 28 of the terminal device 12A performs sound collection with the microphone of the terminal device 12A.

In a case where the mouth of the specific user among the users A1, A2, and A3 is moving, the processor 28 of the terminal device 12A may perform sound collection with the microphone of the terminal device 12A. The specific user is, for example, a user who is logged in to the online conference on behalf of the users A1, A2, and A3, or a user designated in advance.

The processor 28 of the terminal device 12A may control the sound collection with the microphone of the terminal device 12A, based on the movement habit (that is, habit) of the upper body region of the user A. Examples of the movement habit of the upper body region include a habit of moving the neck or the face, and a habit by illness. The movement habit of the upper body region of the user A is registered in the terminal device 12A. A timing of registering the movement habit may be before the start of the online conference, during the online conference, or designated by the user A.

For example, in a case where the front of the face of the user A is photographed and the sound is collected by the microphone of the terminal device 12A, the processor 28 of the terminal device 12A performs sound collection with the microphone of the terminal device 12A even though the front of the face of the user A is not photographed due to the habit of moving the neck or the face of the user A. The processor 28 of the terminal device 12A may detect the habit of moving the neck or the face of the user A based on the user image generated by the camera of the terminal device 12A photographing the user A. The processor 28 of the terminal device 12A may detect the habit with various sensors (for example, gyro sensor and acceleration sensor). For example, a wearable device including various sensors (for example, bearable device, AR glasses, and VR glasses) is worn by the user A, and the habit of the user A is detected by the various sensors. In a case where the habit is detected, the processor 28 of the terminal device 12A performs sound collection with the microphone of the terminal device 12A even though the front of the face of the user A is not photographed. That is, even though the front of the face of the user A is not photographed, the processor 28 of the terminal device 12A continuously performs the sound collection without turning off the microphone of the terminal device 12A.

Figure 9:
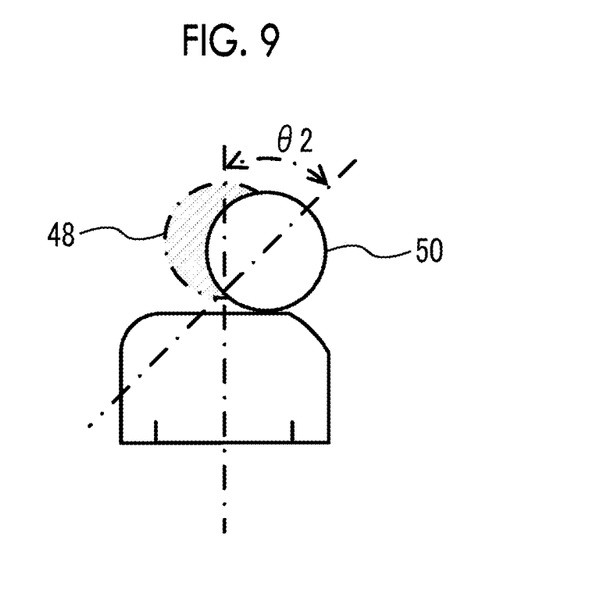
FIG. 9 is a view in a case where a user is viewed from the front.
Figure 10:
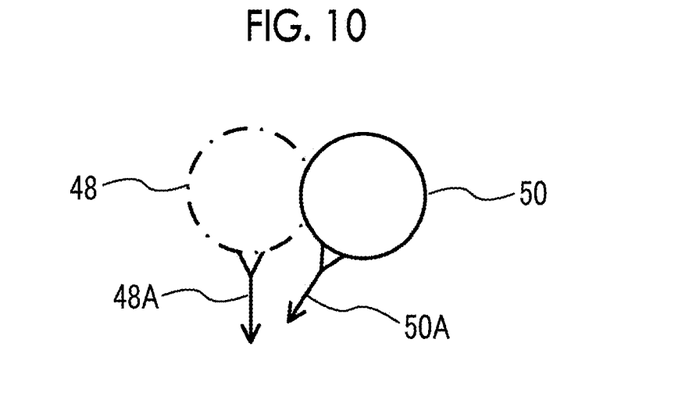
FIG. 10 is a view in a case where the user is viewed from the top of a head.

The control based on the habit will be described in more detail with reference to FIGS. 9 and 10. FIG. 9 is a view in a case where the user A is viewed from the front. FIG. 10 is a view in a case where the user A is viewed from the top of the head.

FIGS. 9 and 10 illustrate the heads 48 and 50 of the user A. It is assumed that the user A has a habit of moving the neck (for example, a habit of twisting the neck). In a case where the user A twists the neck of the user A, the head of the user A is inclined, and the direction of the front of the face of the user changes. The head 48 is a head in a state where the user A does not twist the neck due to the habit. The head 50 is a head in a state where the user A twists the neck due to the habit.

As illustrated in FIG. 9, in a case where the user A twists the neck, the head of the user A is inclined laterally by an angle θ2. That is, the head 50 is inclined laterally by the angle θ2 from the position of the head 48.

FIG. 10 illustrates the direction of the face of the user A. A direction 48A is a direction of the face before the user A twists the neck. A direction 50A is a direction of the face after the user A twists the neck. As illustrated in FIG. 10, after the user A twists the neck due to the habit, the direction of the face changes. Thus, the front of the face of the user A may not be photographed. Even in this case, in a case where the action of the user A twisting the neck is registered as the habit of the user A, the processor 28 of the terminal device 12A performs sound collection with the microphone of the terminal device 12A. For example, in a case where the user A speaks while twisting the neck, the processor 28 of the terminal device 12A performs sound collection with the microphone of the terminal device 12A even in a case where the front of the face of the user A is not photographed. Thus, the voice of the user A is collected by the microphone of the terminal device 12A and transmitted to the users B, C, and D participating in the online conference.

An allowable range of an action by the habit may be defined. The processor 28 of the terminal device 12A may perform sound collection with the microphone of the terminal device 12A in a case where the action of the user A is within the allowable range, and may not perform sound collection in a case where the action of the user A is out of the allowable range. For example, in a case where the action of twisting the neck is registered as the habit of the user A, the allowable range of the turning angle of the neck of the user A is defined, and the turning angle of the neck of the user A is within the allowable range, the processor 28 of the terminal device 12A performs sound collection with the microphone of the terminal device 12A.

The state of the face region of the user may be a sight line of the user. For example, the processor 28 of the terminal device 12A changes the control of sound collection in accordance with the sight line of the user A with respect to the display used in the online conference (for example, the display of the terminal device 12A). Specifically, the processor 28 of the terminal device 12A performs sound collection with the microphone of the terminal device 12A in a case where the user A sees the display (that is, in a case where the display is in front of the sight line of the user A), and does not perform sound collection in a case where the user A does not see the display (that is, in a case where the display is not in front of the sight line of the user A). In a case where the user A speaks toward the display (that is, in a case where the user A speaks while seeing the display), the processor 28 of the terminal device 12A may perform sound collection with the microphone of the terminal device 12A. In a case where the user A does not speak toward the display (that is, in a case where the user A speaks without seeing the display), the processor 28 of the terminal device 12A may not perform sound collection.

Figure 11:
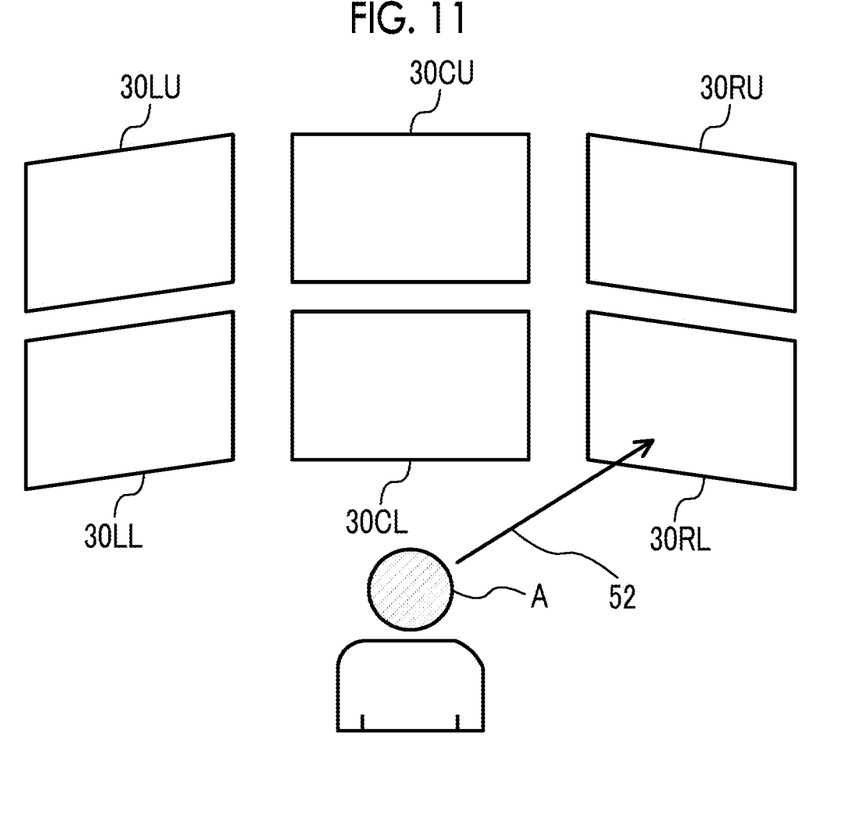
FIG. 11 is a diagram illustrating a positional relation between a display and a user.

An example of controlling sound collection in accordance with the sight line of a user will be described below with reference to FIG. 11. FIG. 11 is a diagram illustrating a positional relation between the display and the user.

FIG. 11 illustrates a user A and a plurality of displays (for example, six displays). Here, as an example, it is assumed that the user A participates in an online conference by using six displays. The number of displays is just an example, and one display may be used, or a plurality of displays other than six may be used.

For example, displays 30CU and 30CL are provided at the center. Displays 30LU and 30LL are provided on the left side, and displays 30RU and 30RL are provided on the right side. The displays 30CU, 30LU, and 30RU are provided on the upper side, and the displays 30CL, 30LL, and 30RL are provided on the lower side. The arrangement of the displays is just an example, and the position of each of the displays may be changed by the user. User images of other users participating in the online conference are displayed on the displays, respectively.

Information indicating the position of each of the displays is stored in the memory 26 of the terminal device 12A, and the position of each of the displays is registered in the terminal device 12A. For example, a screen for setting the position of each of the displays is displayed on the display of the terminal device 12A. The user A designates the display to be used on the screen and sets the position of each of the displays. In the example illustrated in FIG. 11, the displays 30CU, 30CL, 30LU, 30LL, 30RU, and 30RL are designated as the displays used in the online conference, and the positions of the displays are set. That is, the position on the upper side of the center is designated as the position of the display 30CU. It is registered, in the terminal device 12A, that the position of the display 30CL is a position on the lower side of the center. This is similarly applied to other displays.

For example, the processor 28 of the terminal device 12A may detect a sight line 52 of the user A based on the user image generated by the camera of the terminal device 12A photographing the user A. The processor 28 of the terminal device 12A may detect the sight line 52 of the user A with various sensors (for example, gyro sensor and acceleration sensor).

The processor 28 of the terminal device 12A may detect the position of the user A by photographing the user A with the camera of the terminal device 12A, or detect the position of the user based on the user image generated by the photographing. The processor 28 of the terminal device 12A may detect the position of the user A by using the GPS, or define a predetermined position (for example, position facing the central displays 30CU and 30CL) as the position of the user A. For example, the processor 28 of the terminal device 12A photographs the user A with one or a plurality of cameras installed at predetermined positions, and specifies the position of the user A based on the result of the photographing (for example, result indicating the camera that photographs the user A, or result indicating the manner that the user A is photographed).

The processor 28 of the terminal device 12A determines whether or not the user A sees the display, based on the position of the user A, the sight line 52 of the user A, and the position of each of the displays. In a case where the display is in front of the sight line 52 of the user A with reference to the position of the user A, the processor 28 of the terminal device 12A determines that the user A sees the display. In a case where the display is not in front of the sight line 52 of the user A with reference to the position of the user A, the processor 28 of the terminal device 12A determines that the user A does not see the display.

Based on the above determination result, the processor 28 of the terminal device 12A performs sound collection with the microphone of the terminal device 12A in a case where the user A sees the display and speaks, and does not perform sound collection in a case where the user A does not see the display. In this manner, in a case where the user A sees the display and speaks, the voice of the user A is transmitted to the users B, C, and D participating in the online conference. In a case where the user A does not see the display, even though the user A speaks, the voice of the user A is not transmitted to the users B, C, and D participating in the online conference.

In a case where the user A sees the display and speaks, it is supposed that the user A speaks to another user participating in the online conference. In this case, it is possible to transmit the voice of the user A to the other user by the microphone of the terminal device 12A collecting the sound. In a case where the user A speaks without seeing the display, it is supposed that the utterance is not sent to the other user participating in the online conference. In this case, because sound collection with the microphone of the terminal device 12A is not performed, it is possible to prevent the occurrence of a situation in which a sound required not to be transmitted to the other user is transmitted to the other user.

In a case where the display provided in front of the sight line 52 of the user A is not set as the display used in the online conference, the processor 28 of the terminal device 12A does not perform sound collection.

The processor 28 of the terminal device 12A may change the control of sound collection in accordance with the angle of the sight line of the user A. For example, the processor 28 of the terminal device 12A may or may not perform sound collection with the microphone of the terminal device 12A in a case where the sight line of the user A is lowered. Whether or not to perform sound collection may be set by the user.

For example, the processor 28 of the terminal device 12A performs sound collection with the microphone of the terminal device 12A in a case where the sight line of the user A is included within a predetermined range, and does not perform sound collection in a case where the sight line of the user A is not included within the predetermined range.

More specifically, the processor 28 of the terminal device 12A defines the horizon (that is, direction perpendicular to the direction of gravity) as the reference direction. The processor 28 of the terminal device 12A performs sound collection with the microphone of the terminal device 12A in a case where the angle of the sight line of the user A is included within a predetermined angle range from the reference direction, and does not perform sound collection in a case where the angle of the sight line of the user A is not included within a predetermined angle range from the reference direction.

Figure 12:
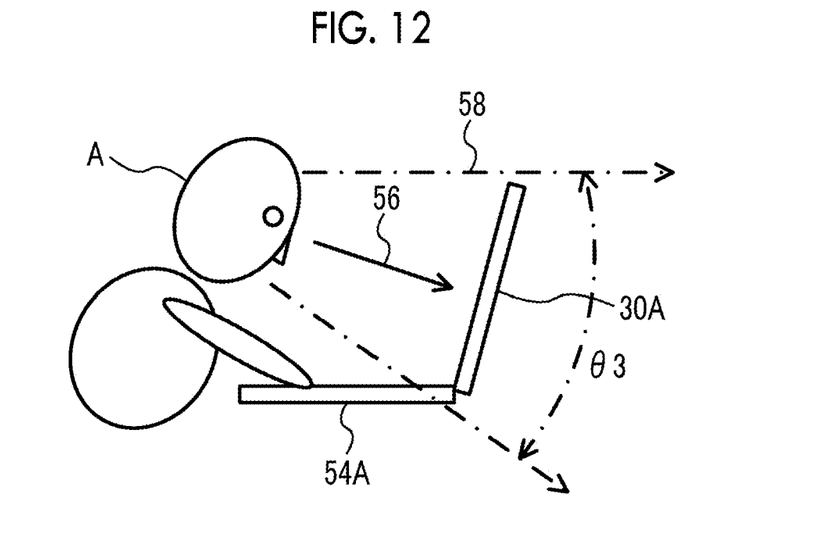
FIG. 12 is a diagram illustrating a sight line of a user.

Another example of controlling sound collection in accordance with the sight line of a user will be described below with reference to FIG. 12. FIG. 12 is a diagram illustrating the sight line of the user A. FIG. 12 schematically illustrates the user A, the display 30A, and a keyboard 54A. The display 30A and the keyboard 54A are provided in the terminal device 12A.

For example, in a case where the user A operates the keyboard 54A (for example, pressing a key) or sees an image displayed on the display 30A, the sight line of the user A is lowered. Describing the example illustrated in FIG. 12, a sight line 56 of the user A is lowered below the horizon 58. In this case, the processor 28 of the terminal device 12A performs sound collection with the microphone of the terminal device 12A. For example, in a case where the user A speaks while inputting text by the keyboard 54A, the voice of the user A is collected, and the voice of the user A is transmitted to the other user participating in the online conference.

The processor 28 of the terminal device 12A may perform sound collection with the microphone of the terminal device 12A in a case where the sight line 56 of the user A is included in a range of an angle θ3 (within a range below the horizon 58) with reference to the horizon 58, and may not perform sound collection in a case where the sight line 56 of the user A is not included in the above range.

As another example, the processor 28 of the terminal device 12A may change the control of sound collection in accordance with whether or not the keyboard 54A is operated. That is, the processor 28 of the terminal device 12A may detect the operation of the keyboard 54A and change the control of sound collection in accordance with the detection result. For example, the processor 28 of the terminal device 12A may perform sound collection with the microphone of the terminal device 12A in a case where the keyboard 54A is operated (for example, in a case where the user A types using the keyboard 54A), and may not perform sound collection in a case where the keyboard 54A is not operated.

In the example illustrated in FIG. 12, an example in which the keyboard 54A is operated has been described, but a mouse, a touch panel, or the like may be used as an operation device other than the keyboard 54A.

In a case where a plurality of users are photographed by the camera of the terminal device 12A, the processor 28 of the terminal device 12A may not perform sound collection even though the sight line of at least one user among the plurality of users is lowered. In this case, in a case where at least one user speaks, the processor 28 of the terminal device 12A may perform sound collection with the microphone of the terminal device 12A. The processor 28 of the terminal device 12A may perform sound collection with the microphone of the terminal device 12A in a case where the speaking user is registered in the terminal device 12A, and may not perform sound collection in a case where the speaking user is not registered in the terminal device 12A.

The state of the face region of the user may be the movement of a mask worn by the user. For example, the processor 28 of the terminal device 12A changes the control of sound collection in accordance with the movement of the mask worn by the user A. Specifically, the processor 28 of the terminal device 12A performs sound collection with the microphone of the terminal device 12A in a case where the mask is moving (for example, in a case where the shape of the mask changes), and does not perform sound collection in a case where the mask is not moving (for example, in a case where the shape of the mask does not change).

In a case where the mask is moving, it is supposed that the mouth of the user A is moving. That is, it is supposed that the mask is moving by the user A speaking. In this case, the sound collection is performed. Thus, in a case where the user A speaks, the voice of the user A is transmitted to other users participating in the online conference.

In a case where the mask is not moving, it is supposed that the mouth of the user A is not moving. That is, it is supposed that the user A does not speak. In this case, sound collection is not performed. In this manner, it is possible to prevent the occurrence of a situation in which a sound required not to be transmitted to the other user participating in the online conference (for example, sound other than the voice of the user A) is transmitted to the other user.

Figure 13:
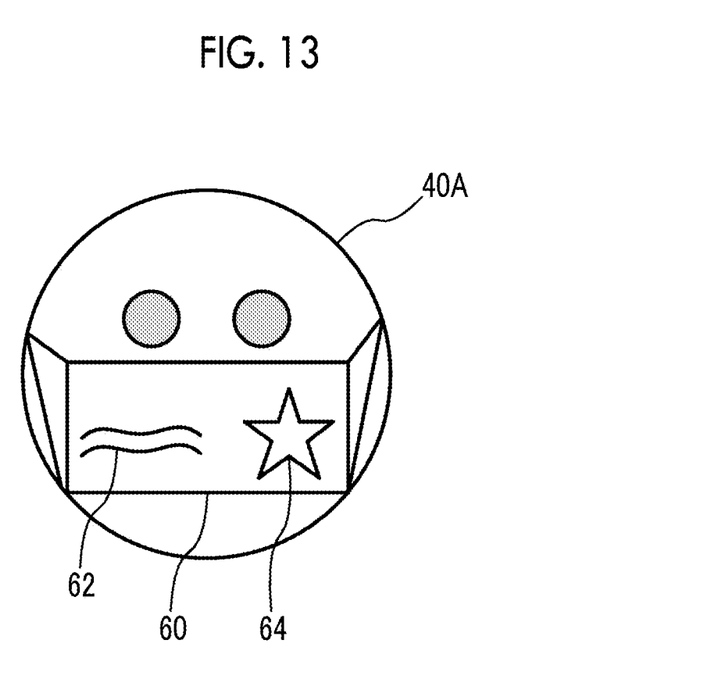
FIG. 13 is a view in a case where a face of a user is viewed from the front.

An example of controlling sound collection in accordance with the movement of the mask will be described below with reference to FIG. 13. FIG. 13 is a view in a case where the face of the user A is viewed from the front. FIG. 13 illustrates the head 40A and a mask 60 of the user A. The user A wears the mask 60, and the mouth of the user A and the surroundings are covered with the mask 60.

For example, the processor 28 of the terminal device 12A detects a change in the shape of the surface of the mask 60. The processor 28 of the terminal device 12A performs sound collection with the microphone of the terminal device 12A in a case where the change in the shape of the surface of the mask 60 is detected, and does not perform sound collection in a case where the change in the shape of the surface of the mask 60 is not detected. For example, in a case where the unevenness 62 is formed on the surface of the mask 60 and the shape of the unevenness 62 changes, the processor 28 of the terminal device 12A performs sound collection with the microphone of the terminal device 12A. In a case where the shape of the unevenness 62 does not change, the processor 28 of the terminal device 12A does not perform sound collection.

The processor 28 of the terminal device 12A may perform sound collection with the microphone of the terminal device 12A in a case where the amount (for example, magnitude of the change) of the change (for example, change in shape of the unevenness 62) in the shape of the surface of the mask 60 is equal to or more than a predetermined threshold value, and may not perform sound collection in a case where the amount of the change is less than the predetermined threshold value. The threshold value may be changed by the user.

The processor 28 of the terminal device 12A may change the control of sound collection in accordance with the change of the shadow formed on the surface of the mask 60. That is, the processor 28 of the terminal device 12A may perform sound collection with the microphone of the terminal device 12A in a case where the shadow formed on the surface of the mask 60 changes or the amount of the change is equal to or more than a threshold value, and may not perform sound collection in a case where the shadow does not change or the amount of the change is less than the threshold value.

An image 64 may be formed on the surface of the mask 60. In this case, the state of the face region of the user A may be a change of the image 64. For example, the image 64 is printed on the surface of the mask 60, or the image 64 is expressed by the fabric of the mask 60.

For example, the processor 28 of the terminal device 12A performs sound collection with the microphone of the terminal device 12A in a case where the image 64 changes, and does not perform sound collection in a case where the image 64 does not change. In a case where the image 64 changes, it is supposed that the mouth of the user A is moving. That is, it is supposed that the user A speaks. In this case, the sound collection is performed. Thus, it is possible to transmit the voice of the user A to the other user participating in the online conference in a case where the user A speaks. In a case where the image 64 does not change, it is supposed that the mouth of user A is not moving. That is, it is supposed that the user A does not speak. In this case, the sound collection is not performed. Thus, it is possible to prevent the occurrence of a situation in which a sound required not to be transmitted to the other user (for example, sound other than the voice of the user A) is transmitted to the other user.

The processor 28 of the terminal device 12A may perform sound collection with the microphone of the terminal device 12A in a case where the amount of change of the image 64 is equal to or more than the predetermined threshold value, and may not perform sound collection in a case where the amount of the change is less than the threshold value.

For example, the processor 28 of the terminal device 12A analyzes the user image generated by the camera photographing the face of the user A, so as to detect the change in the shape of the surface of the mask 60, the change in the shadow formed on the surface of the mask 60, or the change of the image 64.

In a case where the sound is collected by the microphone of the terminal device 12A regardless of the shape of the surface of the mask 60 and the image 64 not changing, the processor 28 of the terminal device 12A may cut (for example, delete) the collected sound. In this case, the collected sound is not transmitted to other users participating in the online conference.

In the above-described exemplary embodiment, various types of processing have been described by using an online conference as an example. The processing according to the present exemplary embodiment may be applied to situations other than the online conference. For example, in a case where a user distributes a moving image with the terminal device 12, the moving image may be distributed in a case where the face of the user is photographed, and the moving image may not be distributed, for example, by stopping the distribution of the moving image, in a case where the face of the user is not photographed. For example, the distribution of the moving image may be stopped in a case where the user turns to the back, and the moving image may be distributed in a case where the user turns to the front. In a case where the distribution of the moving image is stopped, and then the user presses a button (for example, button displayed on the display) for instructing the start of the distribution, the distribution of the moving image may be resumed.

The functions of the units of the server 10 and the terminal device 12 are realized by the cooperation of hardware and software as an example. For example, the processor of each device reads and executes the program stored in the memory of each device to realize the functions of each device. The program is stored in the memory via a recording medium such as a CD or a DVD, or via a communication path such as a network.

In the embodiments above, the term "processor" refers to hardware in abroad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
control of not performing sound collection in accordance with a state of an upper body region of a user who is photographed and not transmitting a sound to other user, during a communication through sound,
wherein the processor is configured to:
not perform the sound collection in a case where a plurality of users are photographed, and mouths of all the plurality of users are not moving.

2. The information processing apparatus according to claim 1, wherein the processor is further configured to:
perform the sound collection in accordance with the state of the upper body region.

3. The information processing apparatus according to claim 1,
wherein the upper body region is a face region of the user.

4. The information processing apparatus according to claim 3,
wherein a state of the face region is a direction of a face of the user.

5. The information processing apparatus according to claim 4, wherein the processor is further configured to:
perform the sound collection in a case where a front of the face of the user is photographed.

6. The information processing apparatus according to claim 5, wherein the processor is configured to:
perform the sound collection in a case where the front of the face of the user is photographed and a mouth of the user is moving.

7. The information processing apparatus according to claim 5, wherein the processor is configured to:
not perform the sound collection in a case where a mouth of the user is not moving.

8. The information processing apparatus according to claim 4, wherein the processor is configured to:
not perform the sound collection in a case where a front of the face of the user is not photographed.

9. The information processing apparatus according to claim 2, wherein the processor is configured to:
in a case where a sound is collected and an output of the collected sound is permitted by the user, transmit the collected sound to a communication partner.

10. The information processing apparatus according to claim 1, wherein the processor is configured to:
not collect a sound other than a registered sound.

11. The information processing apparatus according to claim 1, wherein the processor is further configured to:
collect sounds of users within the registered number of persons.

12. The information processing apparatus according to claim 2, wherein the processor is further configured to:
control the sound collection based on a movement of the upper body region.

13. The information processing apparatus according to claim 3,
wherein a state of the face region is a sight line of the user.

14. The information processing apparatus according to claim 13,
wherein the communication of transmitting a sound is realized by an online conference, and
the processor is configured to: change the control of the sound collection in accordance with the sight line of the user with respect to a display used in the online conference.

15. The information processing apparatus according to claim 14, wherein the processor is configured to:
perform the sound collection in a case where the user speaks toward the display, and
not perform the sound collection in a case where the user does not speak toward the display.

16. An information processing apparatus comprising:
a processor configured to:
control of not performing sound collection in accordance with a state of an upper body region of a user who is photographed and not transmitting a sound to other user, during a communication through sound, wherein the upper body region is a face region of the user, and wherein a state of the face region is a movement of a mask worn by the user.

17. An information processing apparatus comprising:
a processor configured to:
   control of not performing sound collection in accordance with a state of an upper body region of a user who is photographed and not transmitting a sound to other user, during a communication through sound,
wherein the upper body region is a face region of the user, and
wherein a state of the face region is a change in an image formed on a mask worn by the user.

* * * * *